Patented June 17, 1930

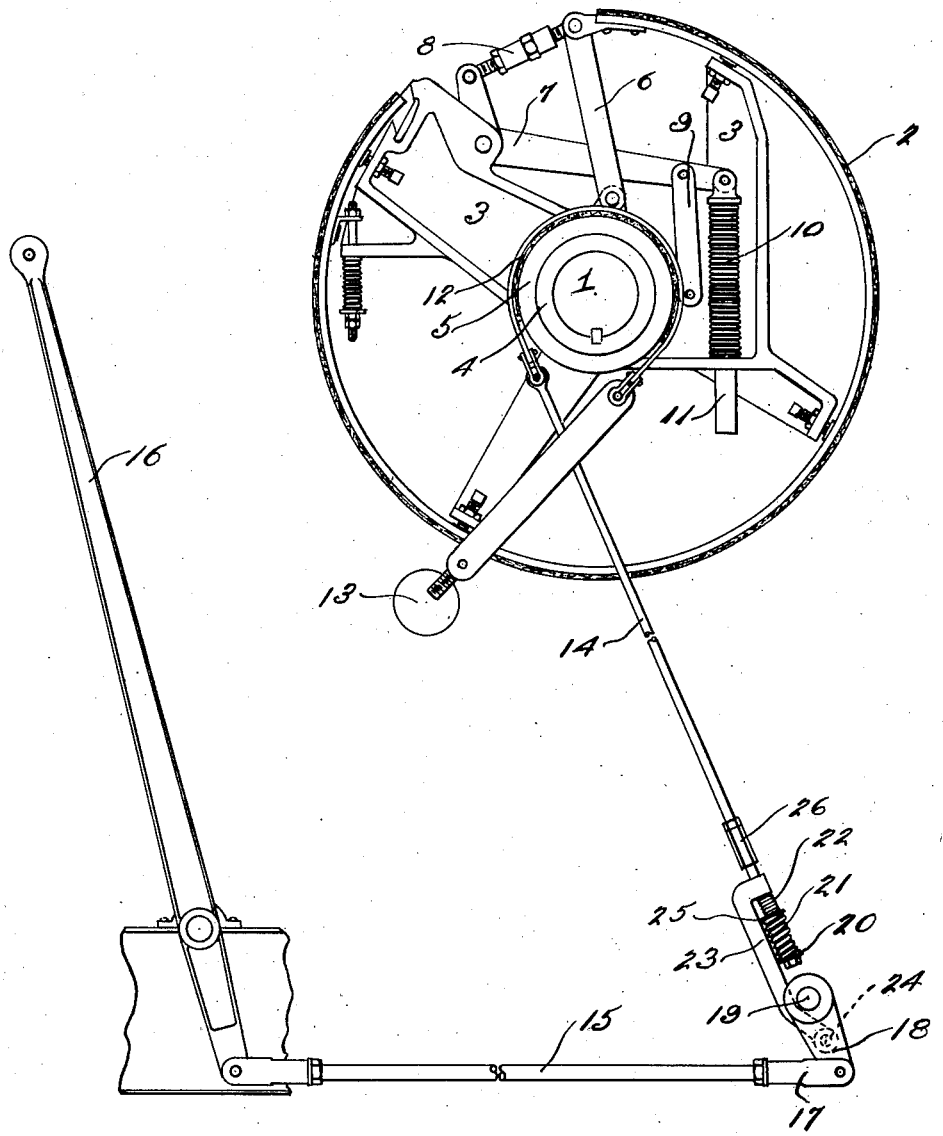

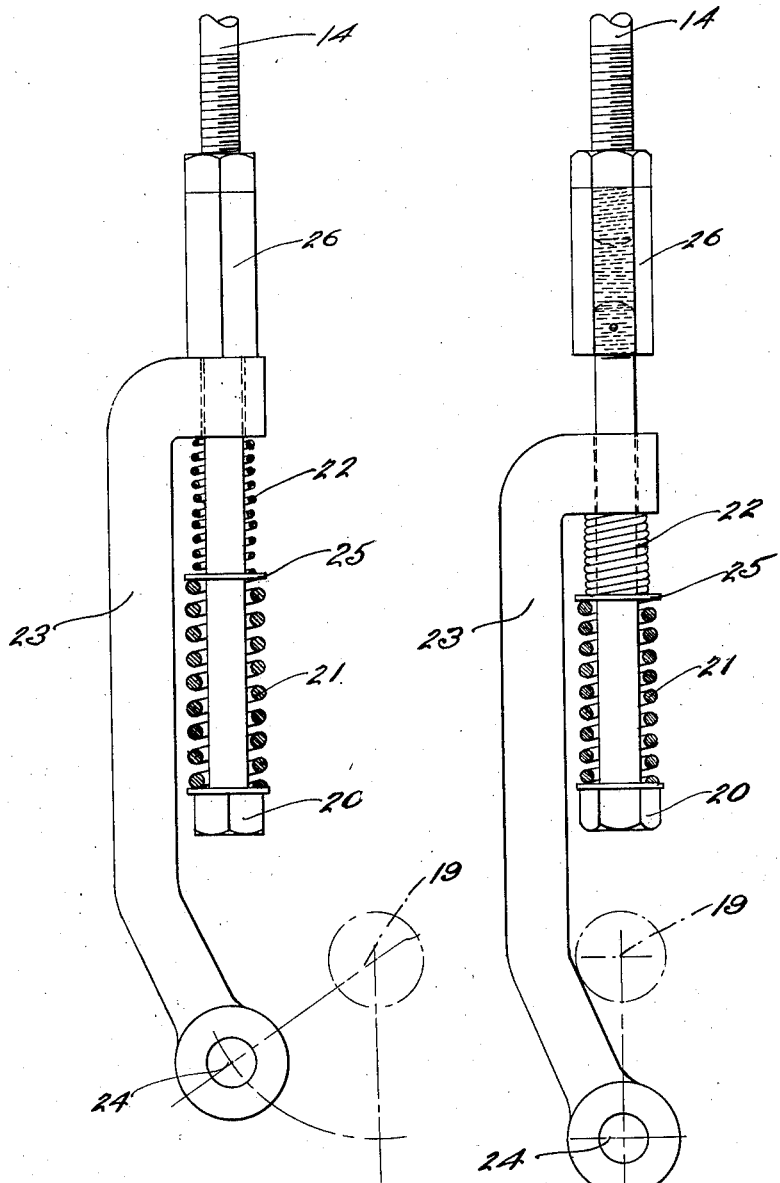

1,764,923

UNITED STATES PATENT OFFICE

EMERY J. WILSON, OF CLEVELAND, OHIO, ASSIGNOR TO THE THEW SHOVEL COMPANY, OF LORAIN, OHIO, A CORPORATION OF OHIO

FRICTION-CONTROL MECHANISM

Application filed November 18, 1926. Serial No. 149,146.

This invention relates to means for gradually applying friction in increasing predetermined amount up to a maximum, and has special reference to employment of such means in connection with a certain type of large friction clutch adapted for intermittent engagement under heavy loads wherein control of the main clutch is effected by a pilot or "booster" clutch or brake which requires finely graduated manipulation to produce proper engaging action of the main clutch.

To these ends I have provided a spring connection adapted to be inserted in a clutch controlling tension member, the spring connection being of a compound nature such as to produce the requisite engaging characteristic in the booster brake member to give the desired main clutch action.

The exact nature of my invention will be apparent from the following description taken in connection with the accompanying drawings in which Fig. 1 is an assembly drawing of my invention applied to a clutch of the type described and Figs. 2 and 3 are details of the invention in the respective operating positions.

Referring specifically to the drawings the clutch illustrated is mounted upon the shaft 1. The main clutch includes as one of its pair of principal elements a cylindrical friction faced clutch member 2 adapted to be driven continuously by the shaft 1 which is in connection with a suitable driving means such as a governor controlled internal combustion engine; the member 2 being expansible to engage with a corresponding drive member not shown, but which is in connection with the mechanism to be intermittently driven, such as a winding drum of a power shovel.

The clutch member 2 is supported upon a spider 3 the arms of which extend generally radially from a hub 4 secured upon the shaft 1; one end of the clutch member being secured upon the spider, the other movable generally circumferentially as by the linkage illustrated which in turn is controlled by the cylindrical sleeve 5 mounted for free rotation upon the hub 4.

In the mechanism shown the movable end of the main clutch member 2 is radially spaced by the link 6 and circumferentially movable for expansion or contraction by the bellcrank lever 7 which is pivotally mounted upon the spider 3, connected with the clutch member by the adjustable link 8, with the sleeve 5 by the link 9, and which is normally retained in a position to contract the main clutch member 2 by the compression spring 10 positioned upon the rod 11. It will be seen that rotary movement of the sleeve 5 in a clockwise direction with respect to the hub 4 will effect expansion of the main clutch member 2 against the compression of the spring 10, the parts being shown in this position; after which release of the sleeve will allow the spring 10 to return the clutch member to a contracted position.

In practice, the shaft 1 is normally maintained in rotation in a counter-clockwise direction so that expansion of the main clutch member 2 to engage the driven member of the clutch may be effected simply by imposing a suitable drag upon the sleeve 5. For this purpose the sleeve is provided with a cylindrical surface for cooperation with the booster brake band 12, one end of which is fixed upon a suitable portion of the frame of the machine as at 13, the other end of which is movable to tighten the band upon the friction surface of the sleeve. As shown, the free end of the brake band is secured with an end of the pull rod 14 operable through the linkage shown including horizontal pull rod 15, by the operator operated hand lever 16, mounted in a suitable position upon the machine. The end of the pull rod 15 removed from the hand lever is connected by the clevis 17 with the end of a lever arm 18 which is pivoted at 19 upon the machine. The lower end of the pull rod 14 is headed by the adjustable nut 20 which positions upon the rod a pair of springs 21 and 22 to be described. Positioned upon the rod above the spring 22 is an end of a link 23, the lower end of which is pivotally secured upon the lever arm 18 at the point 24. The arrangement of the parts is such that when the hand lever 16 is in the position shown the lever 18 is in a dead center position with respect to the pull rod 14, and band 12 is tightened with maximum friction upon the sleeve 5 and the clutch is consequently engaged.

It is obvious that with the clutch arrangement described, a very fine control of the brake band 12 is necessary to effect proper clutch action. It is for this reason that I have provided the two springs described upon the pull rod 14. The springs are separated, as indicated, by the washer 25 and are of such capacity that the spring 22 will be entirely collapsed before compression of the spring 21 is appreciable; after which compression of the spring 21 is effected to the limit determined by the position of the nut 20 upon the pull rod 14, in practice this being such that the spring is very slightly compressed. The spring 22 is of such strength as to effect a suitable gradual engagement of the brake band upon the collar 5, and the spring 21 is of such strength that when the parts are in the position of Fig. 1 such a tension will be maintained upon the brake band that no slippage will result between the clutch member 2 and its co-operating friction surface. In other words, the springs are of such strength that assuming proper adjustment of the parts when the clutch is engaged just sufficient slippage will be allowed between the brake band and the collar 5 to prevent slippage between the primary friction members of the clutch, the heavier spring 21 being operative to care for slippage of the clutch member 2 in case of emergency such as overload. The length of the pull rod 14 is adjustable in the usual manner by the nut 26 adapted for engagement with the link 23 to insure positive release of the brake band 12 in the disengaged position of the clutch.

It will be seen that by the arrangement described, provided the proper preliminary adjustment is made, no matter how rapid a movement is given to the hand lever 16, engagement of the clutch will be effected in the most efficient manner possible.

What I claim is:

Friction clutch mechanism of the class described, comprising a movable main clutch member, a pair of booster brake members associated therewith for control of the same, and means for controlling the engagement of said brake members and including an operator-operated member arranged for movement between clutch-released and predetermined clutch-engaged positions and having connection with one of said brake members, said connection including a crank lever, a pull rod, and means associating said rod with the crank of said lever, said parts being so arranged that as said operator-operated member is moved to clutch-engaged position, said crank is caused to move to dead center position relative to said rod, and a pair of springs of differing strengths arranged in series relation and arranged to be effective in yielding relation between said rod and said crank, whereby as the parts are moved to clutch-engaged position said springs yield in sequence, and the weaker spring determines the clutch-engaging characteristic and the stronger spring determines the maximum braking friction.

In testimony whereof I hereby affix my signature.

EMERY J. WILSON.